United States Patent
Umeda

(10) Patent No.: US 7,329,215 B2
(45) Date of Patent: Feb. 12, 2008

(54) COOLING STRUCTURE FOR MOTORIZED ROLLER

(75) Inventor: Kazuyoshi Umeda, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 428 days.

(21) Appl. No.: 10/809,933

(22) Filed: Mar. 26, 2004

(65) Prior Publication Data

US 2005/0124477 A1    Jun. 9, 2005

(30) Foreign Application Priority Data

Mar. 27, 2003    (JP)    ............................. 2003-087589

(51) Int. Cl.
*F28F 5/02*    (2006.01)
(52) U.S. Cl. ........................................ 492/46; 198/788
(58) Field of Classification Search ................ 492/46, 492/60, 16; 198/788, 780
See application file for complete search history.

(56) References Cited

U.S. PATENT DOCUMENTS

| | | | | |
|---|---|---|---|---|
| 1,820,985 A | * | 9/1931 | McKee | 198/788 |
| 2,436,930 A | * | 3/1948 | Mackmann | 310/52 |
| 2,540,099 A | * | 2/1951 | Christian | 74/421 A |
| 2,736,209 A | * | 2/1956 | Christian | 74/421 A |
| 4,082,180 A | * | 4/1978 | Chung | 198/835 |
| 5,290,216 A | * | 3/1994 | Burlion et al. | 492/11 |
| 5,413,209 A | * | 5/1995 | Werner | 198/500 |
| 6,672,449 B2 | * | 1/2004 | Nakamura et al. | 198/788 |

FOREIGN PATENT DOCUMENTS

| | | |
|---|---|---|
| JP | 62-216826 | 9/1987 |
| JP | 11-127556 | 5/1999 |

* cited by examiner

*Primary Examiner*—Essama Omgba
(74) *Attorney, Agent, or Firm*—Squire, Sanders & Dempsey, L.L.P.

(57) ABSTRACT

A cooling structure for a motorized roller is provided, which has a simple construction, and is capable of effectively reducing temperature increases inside the apparatus. Such a motorized roller includes a motor and a reducer which are disposed inside a roller body. Rotations of the motor are reduced by the reducer and transmitted to the roller body, and a reaction force to the driving force of the roller body is able to be received, via casings that house the motor and the reducer, by an external member that fixes the casings so that rotations of the casings are prevented. In this cooling mechanism for the motorized roller, an air passage for guiding air in an axial direction from one end of the reducer to the other end is formed in an outer peripheral surface of the casing for the reducer.

11 Claims, 6 Drawing Sheets

COOLING STRUCTURE FOR MOTORIZED ROLLER

BACKGROUND OF THE INVENTION

1. Field of the Invention

The present invention relates to a motorized roller such as a motor pulley or a motor roller used in a conveyor or the like, and more particularly to a cooling structure for a motorized roller that has a simple construction, and is capable of effectively reducing temperature increases inside the apparatus.

2. Description of the Related Art

Motorized rollers have been proposed in a variety of configurations (for example, see Japanese Patent Laid-Open Publication No. 1999-127556). The proposed motorized roller is configured in such a manner that a motor and a reducer are disposed inside a roller body, and the rotation of the motor is reduced by the reducer and then transmitted to the roller body so that when fixed to an external member the roller body is able to rotate. As shown in FIG. 4, this type of motorized roller can be used as a motor roller MR for moving a package 4 placed on top of a conveyor 2 through direct contact. Alternatively, as shown in FIG. 5, the motorized roller can also be used as a motor pulley MP for moving the package 4 via a belt 6.

FIG. 6 shows an example of a conventional motorized roller MR1.

A motor M1 and a reducer R1 are housed inside a pipe body (a drum) 10, and the rotation of the motor M1 is reduced by the reducer R1 and then transmitted to the pipe body 10.

The motor M1 is equipped with a motor shaft 12, and this motor shaft 12 also functions as the input shaft 13 for the reducer R1.

The reducer R1 is a so-called oscillating inner gearing planetary gear reducer comprising the input shaft (a first shaft) 13, an external gear 16, an internal gear 18, and an output shaft (a second shaft) 20. The external gear 16 is incorporated into the outer periphery of the input shaft 13 via an eccentric body 14 and is able to undergo eccentric oscillating rotation relative to the input shaft 13. The internal gear 18 engages on the inside with the external gear 16. The output shaft 20 is connected to the external gear 16 so that the output shaft 20 can absorb the eccentric oscillation component of the external gear 16.

When the input shaft 13 undergoes a single rotation, the external gear 16 undergoes a single eccentric oscillation about the motor shaft 12 via the eccentric body 14. This eccentric oscillation causes a sequential displacement in the (internal contact) engagement position between the internal gear 18 and the external gear 16, so that the engagement position makes a single rotation. However, because the number of teeth of the external gear 16 is less than the number of teeth of the internal gear 18 by a value of N (usually 1), the external gear 16 undergoes a phase displacement (rotation) relative to the internal gear 18 by an amount equivalent to this difference N in the number of teeth.

Accordingly, if only this rotation component of the external gear 16 is delivered, then a large speed reduction ratio of (difference in the number of teeth N)/(number of teeth of the external gear) can be achieved. In the conventional example shown, the oscillation component of the external gear 16 is absorbed by the loose fit between an inner pin 22 that protrudes from the output shaft (the second shaft) 20, and an inner pin aperture 24 that penetrates into the external gear 16. Only the rotation component is then transmitted to the output shaft (the second shaft) 20 via the inner pin 22.

The rotational torque transmitted to the output shaft 20 is transmitted to the pipe body 10 via a bracket 26.

However, in this conventional motor roller MR1, the torque generated on the motor shaft 12 side, which corresponds to the reactive torque for rotating the pipe body 10, is transmitted to a fixed shaft 38, and the reactive torque generated on the internal gear 18 side is transmitted to the same fixed shaft 38 via a casing 30, a mounting plate 32, a fixed pipe 34, and a bolt 36. As a result, a fixed pipe 34 is positioned inside the pipe body 10 to form a double pipe arrangement. This means that size increases (particularly in the radial direction) are unavoidable, and that the number of components increases.

One technique that has been proposed for resolving these types of problems is the motorized roller MR2 shown in FIG. 7. FIG. 7 is a side sectional view of the motorized roller MR2.

A reducer R2 employed in this motorized roller MR2 is similar to the first conventional example described above in that it represents an oscillating inner gearing planetary gear reducer, and comprises an input shaft (a first shaft) 53 that forms a single integrated unit with the motor shaft 52 of the motor M2, an eccentric body 54, an external gear 56, and an internal gear 58. An output shaft (a second shaft) 62 is connected to the external gear 56 via an oscillating shaft 60 that absorbs the eccentric oscillation component of the external gear 56.

In this motorized roller MR2, a reaction force to the driving force of the roller body 50 exists as either a torque that rotates the internal gear 58, or as a torque that rotates the motor shaft 52 reversely. Reactive torques generated at the internal gear 58 and the motor shaft 52 are transmitted to a mounting shaft 72 via the casing 70 that houses the motor M2 and the reducer R2. The reactive torques are received by fixing the mounting shaft 72 to an external member 80 such as a conveyor frame or the like so that rotation is prevented.

Accordingly, in the motorized roller MR2 there is no need to adopt a double pipe structure inside the roller body 50, meaning the apparatus can be made more compact (particularly in the radial direction).

However, as a result of making the conventional motorized roller MR2 more compact in the radial direction, the spacing S1 between the roller body 50 and the casing 70 decreases, and because one end 70a of the casing 70 is closed, heat generated by the motor M2 and the reducer R2 tends to become trapped inside the motorized roller MR2, meaning the inside is prone to increase in temperature. Moreover, because the roller body 50 rotates around the casing 70, which is fixed to the external member 80, the air between the casing 70 and the roller body 50 also moves in a circumferential direction in conjunction with the rotation of the roller body 50. Considered from a different perspective, the air between the casing 70 and the roller body 50 is hard to move in the axial direction, so that the same air remains trapped, making it difficult to dissipate the heat generated within the roller.

Furthermore, introducing an oil coolant into the motorized roller MR2 could be considered as one method of achieving cooling, but this would require measures to prevent problems such as oil leakage, and would not only make the structure more complex, but would also increase the number of structural restrictions in designing.

SUMMARY OF THE INVENTION

In order to solve the problems described above, it is an object of the present invention to provide a cooling structure for a motorized roller that is of simple construction, and is capable of effectively reducing temperature increases inside the apparatus.

The present invention resolves the problems described above by providing a cooling mechanism for a motorized roller. The motorized roller includes a motor and a reducer which are disposed inside a roller body. The rotation of the motor is reduced by the reducer and transmitted to the roller body, and a reaction force to the driving force of the roller body is able to be received, via casings that house the motor and the reducer, by an external member that fixes the casings so that rotations of the casings are prevented. In this cooling mechanism, an air passage for guiding air in an axial direction from one end of the reducer to the other end is formed in an outer peripheral surface of the casing for the reducer.

According to the present invention, because an air passage for guiding air in an axial direction from one end of the reducer to the other end is formed in the outer peripheral surface of the casing for the reducer, the air in the air passage is prevented from moving in a circumferential direction in conjunction with the rotation of the roller body, so that movement of the air in the axial direction occurs extremely easily. As a result, air inside the roller body that has been heated by the heat generated by the motor and the reducer can be easily guided away from the casing of the reducer through the air passage, then, stagnation of the air around the vicinity of the reducer can be prevented, which can achieve a reduction in temperature increases inside the roller body. Moreover, this cooling effect can be achieved with a simple construction, which means the design process is simple and development costs can be reduced.

In the present invention, the casing for the motor may be positioned coaxially with the casing of the reducer, and an air passage may be formed in an outer peripheral surface of the motor casing. The air passage of the casing of the motor is positioned substantially in-line with the air passage formed in the outer peripheral surface of the casing of the reducer and guides air in the axial direction from one end of the motor to the other end. This enables the guide of hot air from inside the roller body effectively without becoming trapped inside both the casings of the motor and the reducer, enabling a reduction in temperature increases inside the roller body.

In addition, an air passage for guiding air in the axial direction from one end of the roller body to the other end may be formed in an inner peripheral surface of the roller body. This enables further reductions in the temperature increases inside the roller body. In addition to this, because the air passage is formed in the inner peripheral surface of the rotated roller body, the cooling effect can be further enhanced. The air passage formed in the inner peripheral surface of the roller body may obliquely be formed relative to the axial direction, then the smoothness of the air flow through the passage can be further improved.

On the other hand, the present invention also resolves the problems described above by providing another cooling mechanism for a motorized roller. The motorized roller includes a motor and a reducer which are disposed inside a roller body. The rotation of the motor is reduced by the reducer and transmitted to the roller body, and a reaction force to the driving force of the roller body is able to be received, via casings that house the motor and the reducer, by an external member that fixes the casings so that rotations of the casings are prevented. In this cooling mechanism, a rotor is provided inside the roller body on an opposite side of the reducer from the motor, and is connected to an output rotational shaft of the reducer so that it can transmit power, and a ventilation hole is formed in the rotor in an axial direction.

According to this aspect of the present invention, air flow inside the roller body is not inhibited by the existence of the rotor, and the rotation of this rotor can cause air inside the roller body to be actively circulated. In this aspect of the construction, the ventilation hole may obliquely be formed relative to the axial direction of the rotor, then the air circulating effect can be further enhanced through a pump effect.

In addition, mounting flanges that have a substantially circular plate shape and are capable of relative rotation with respect to the roller body may be provided at both end sections of the roller body, and ventilation holes may be formed in the mounting flanges in the axial direction, then the motorized roller can be made more compact (particularly in the axial direction), and the mounting strength can be improved. Furthermore, ventilation between the inside of the roller body and the exterior becomes possible through the ventilation holes, and a reduction in potential temperature increases inside the roller body can be achieved.

DETAILED DESCRIPTION OF THE PREFERRED EMBODIMENTS

An embodiment of the present invention will now be described in detail hereinafter with reference to the drawings.

Figure 1:
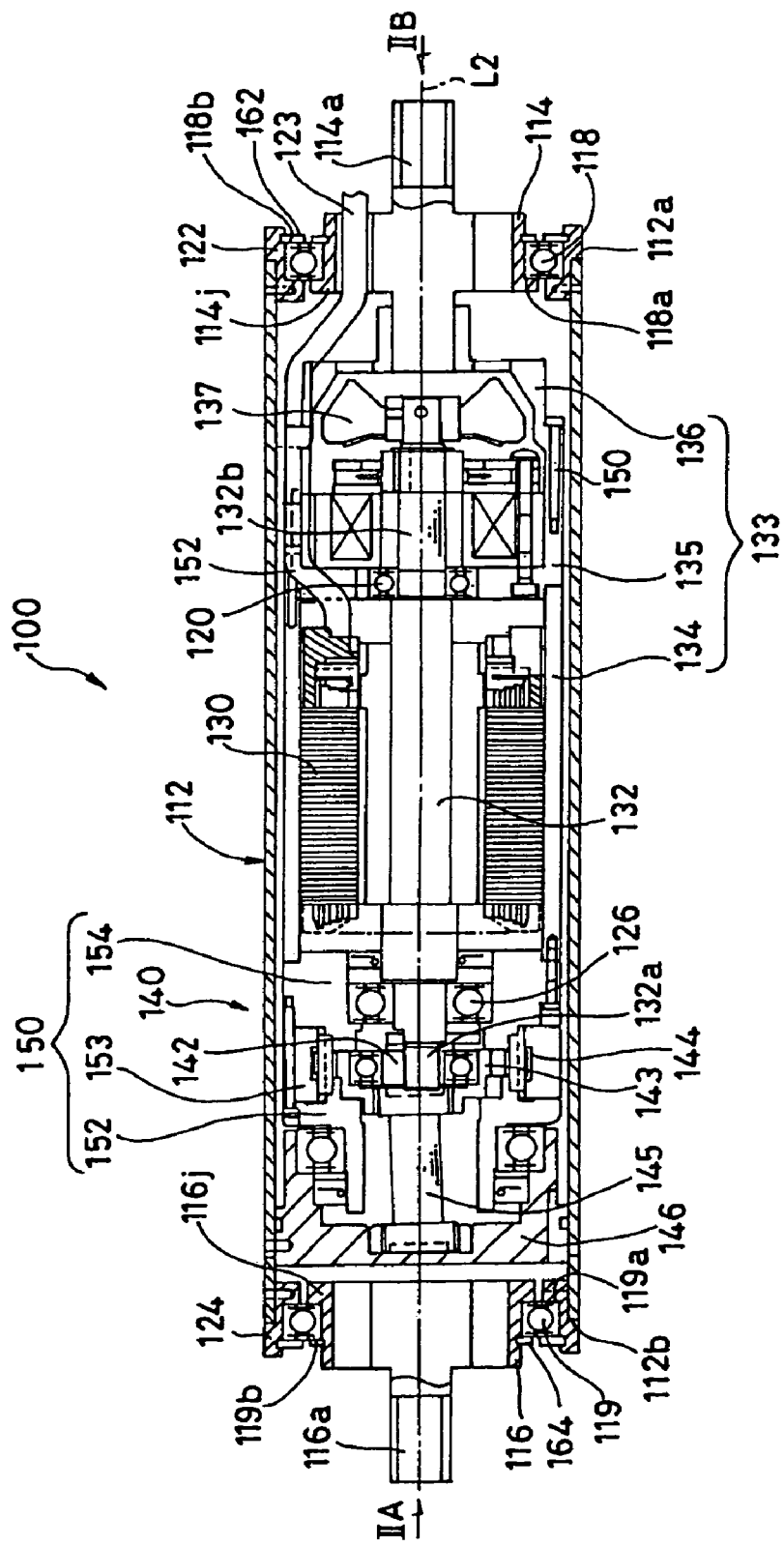
FIG. 1 is a side sectional view showing a motorized roller according to an embodiment of the present invention.
Figure 2:
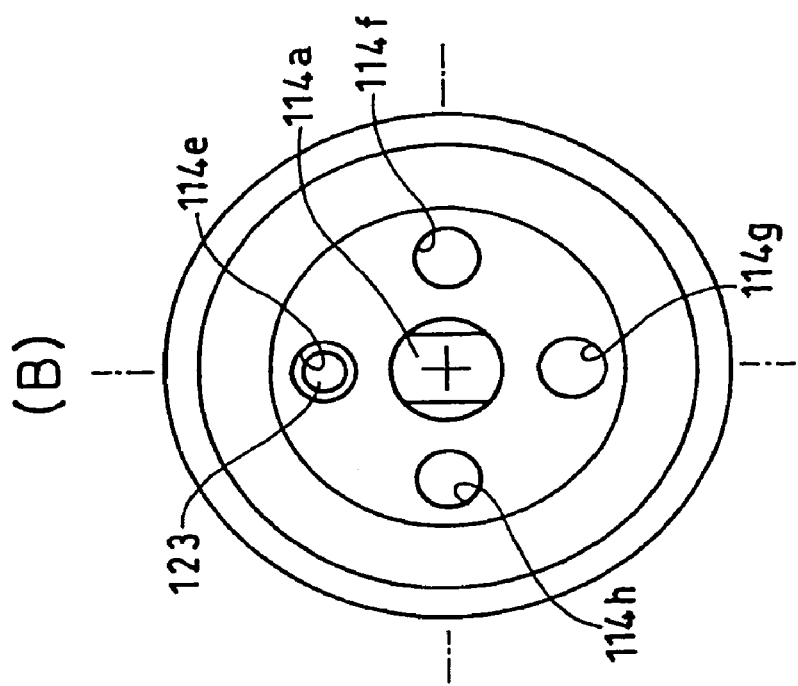
FIGS. 2(A) and 2(B) are side views shown along the arrow directions IIA and IIB in FIG. 1, respectively.
Figure 2:
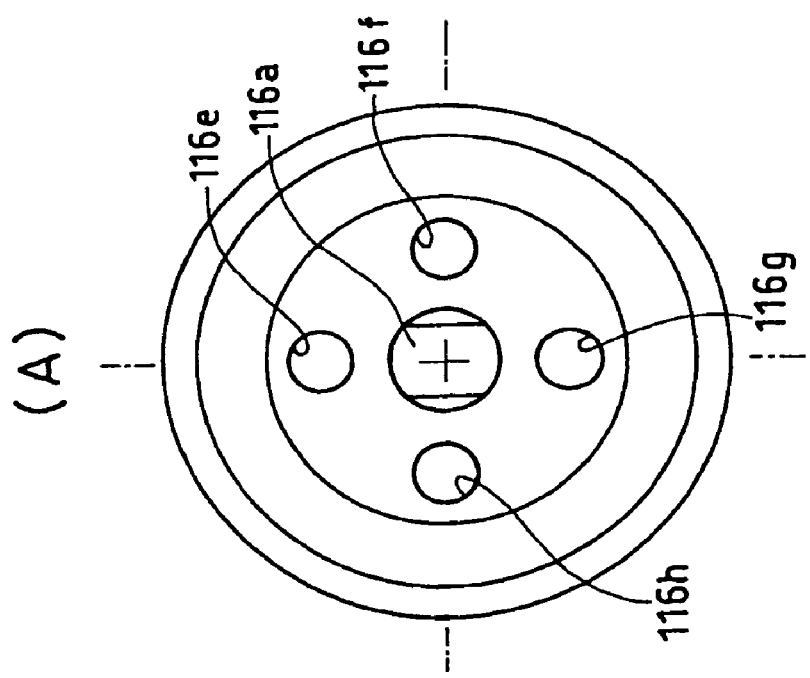
Figure 7:
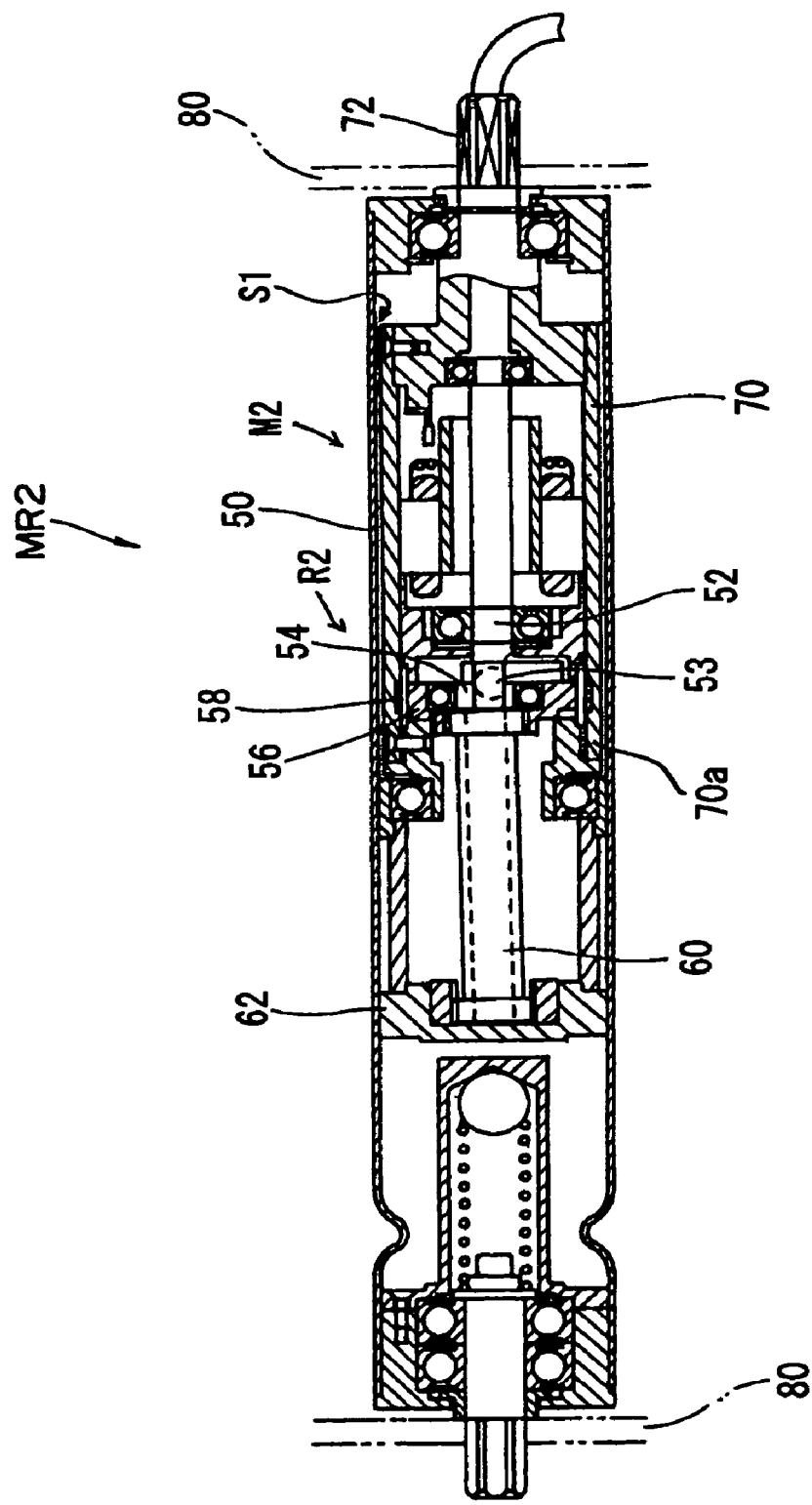
FIG. 7 is a side sectional view showing another conventional motorized roller.

FIG. 1 and FIGS. 2(A) and 2(B) are diagrams showing a motorized roller 100 according to the embodiment of the present invention, wherein FIG. 1 is a side sectional view of the motorized roller 100 which corresponds with the view of the conventional roller shown in FIG. 7, and FIGS. 2(A) and 2(B) are side views shown along the arrow directions IIA and IIB in FIG. 1, respectively.

This motorized roller 100 comprises a motor 130 and a reducer 140 disposed inside a roller body 112, and the rotation of the motor 130 is reduced by the reducer 140 and transmitted to the roller body 112.

The roller body 112 is a substantially circular cylindrical member, and the motor 130 and the reducer 140 are both housed inside this roller body 112. Furthermore, bearings 118 and 119 are disposed at both end sections 112a and 112b of the roller body 112, with ring shaped members 122 and 124 disposed therebetween, respectively. A pair of mounting brackets, namely a first mounting bracket 114 and a second mounting bracket 116, are retained so that they can relatively rotate with respect to the roller body 112 via the bearings 118 and 119. Accordingly, the roller body 112 can rotate about the central axis L2 of the first and second mounting brackets 114 and 116.

The first and second mounting brackets 114 and 116 also function as conventional roller covers for sealing both the end sections 112a and 112b of the roller body 112.

As shown in FIGS. 2(A) and 2(B), the first mounting bracket 114 and the second mounting bracket 116 are each formed from a substantially circular plate shaped member, and can relatively rotate with respect to the roller body 112 about the central axis L2 shown in FIG. 1. Furthermore, mounting shafts 114a and 116a for fixing the first and second mounting brackets 114 and 116 to an external member such as a conveyor frame protrude from the brackets along the axis L2. Through holes 114e to 114h and 116e to 116h for enabling ventilation between the inside of the roller body 112 and the exterior are also formed in the mounting brackets 114 and 116, respectively.

Of the four through holes 114e to 114h provided in the first mounting bracket 114, motor wiring 123 which connects to the motor 130 is inserted through the through hole 114e.

Returning to FIG. 1, a frame body 114j is provided at one end of the first mounting bracket 114 (the end towards the center of the roller body 112), and this frame body 114j contacts an end face 118a of the bearing 118. Furthermore, a retaining ring 162 is engaged onto the other end of the frame body 114j, and contacts the opposite end face 118b of the bearing 118. In other words, the first mounting bracket 114 is restricted from moving along the axis L2 by the bearing 118.

On the other hand, a frame body 116j is provided at one end of the second mounting bracket 116 (the end towards the center of the roller body 112), and this frame body 116j contacts an end face 119a of the bearing 119. Furthermore, a retaining ring 164 is engaged onto the other end of the frame body 116j, and contacts the opposite end face 119b of the bearing 119. In other words, the second mounting bracket 116 is restricted from moving along the axis L2 by the bearing 119.

The motor 130 is an air cooled motor for general purpose. A casing 133 for the motor 130 is configured so that an end cover 136 which is integrated with the first mounting bracket 114, a fan cover 135, and a main casing 134 are connected together with bolts 150 and 152, and the end cover 136 is fixed to an external member not shown in the drawings in a non-rotatable manner, via the first mounting bracket 114. The various structural components of the motor 130 itself are housed inside the casing 133 (134, 135, 136). A motor shaft 132 that represents the output shaft of the motor 130 is supported at both ends by a pair of bearings 120 and 126 that are built into the casing 133. One end section 132a of the motor shaft 132 extends from the bearing 126 in an overhanging arrangement, and is used as the input shaft for the reducer 140. The other end of the motor shaft 132 is connected to a cooling fan 137, and this cooling fan 137 can be rotated by the rotation of the motor shaft 132.

The reducer 140 is of basically the same construction as the reducer R2 used in the motorized roller MR2 described above as an example of the conventional technology. In other words, the reducer 140 is a so-called oscillating inner gearing planetary gear reducer comprising an input shaft (one end section of the motor shaft 132) 132a, an external gear 143, an internal gear 144, and an oscillating shaft 145.

The external gear 143 is incorporated into the outer periphery of the input shaft 132a via an eccentric body 142 and is able to undergo eccentric oscillating rotation relative to the input shaft 132a. The internal gear 144 engages on the inside with the external gear 143. The oscillating shaft 145 is connected to the external gear 143 so that it can absorb the eccentric oscillation component of that external gear 143. The entire reducer 140 is housed and supported inside a casing 150. Furthermore, the oscillating shaft 145 can transmit power to the roller body 112 via a circular plate shaped base rotor 146, thereby enabling rotational driving of the roller body 112.

The casing 150 that houses the speed reduction mechanism of the reducer 140 comprises a main casing 153, a joint cover 154, and an output cover 152. Furthermore, as is evident from FIG. 1, the casing 133 for the motor 130 (the motor casing) and the casing 150 for the reducer 140 (the reducer casing) are integrated together in a coaxial arrangement, and the reaction force to the driving force of the roller body 112 can be received by an external member not shown in the drawing, via the motor casing 133 and the reducer casing 150.

Figure 3:
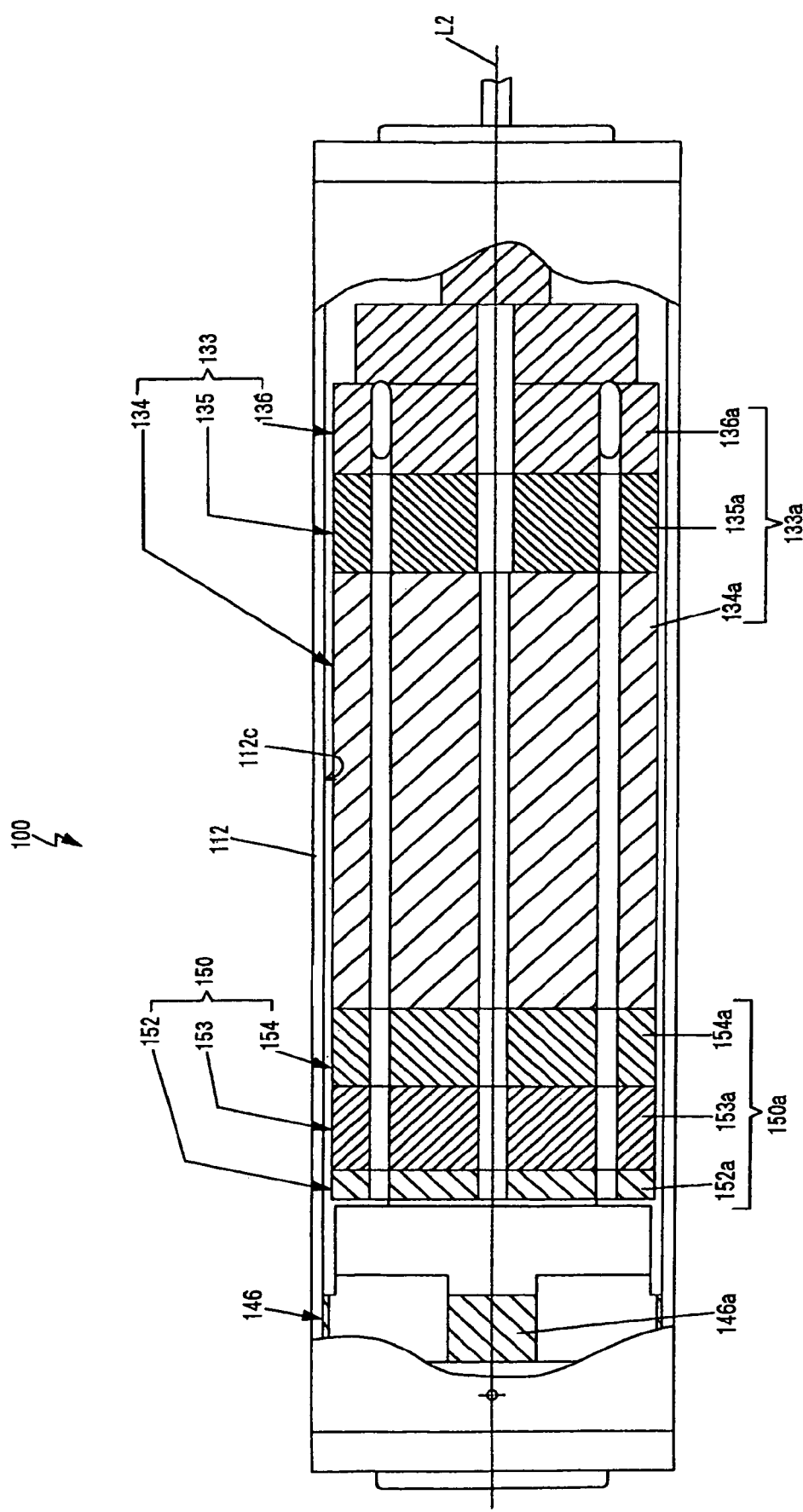
FIG. 3 is a schematic illustration showing the outer peripheral surfaces of a motor casing and a reducer casing.
Figure 4:
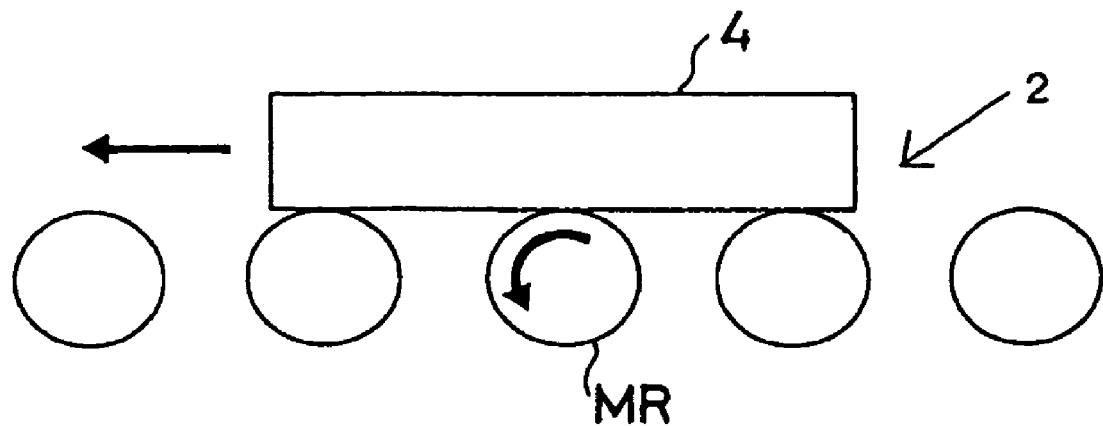
FIG. 4 is a schematic front view showing an example of a motorized roller applied to a motor roller system.
Figure 5:
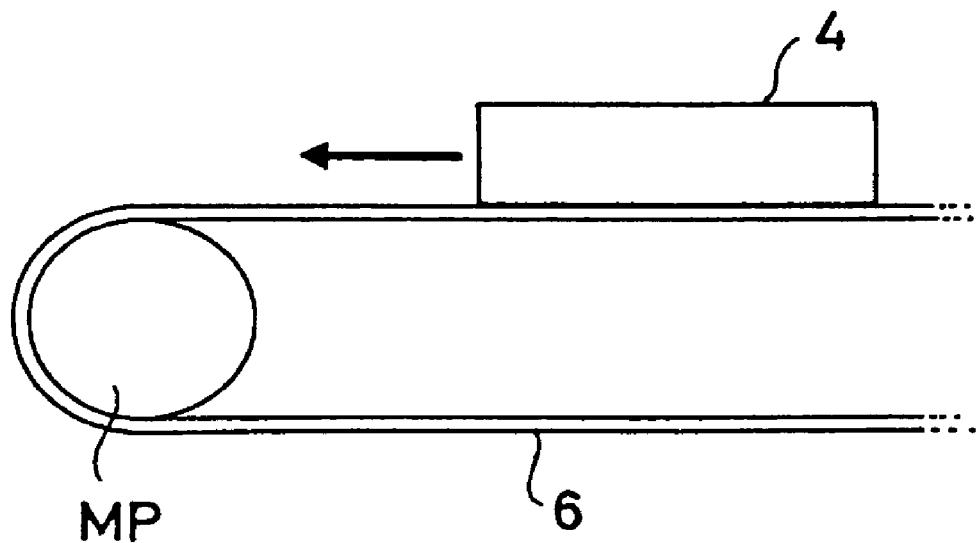
FIG. 5 is a schematic front view showing an example of a motorized roller applied to a motor pulley system.
Figure 6:
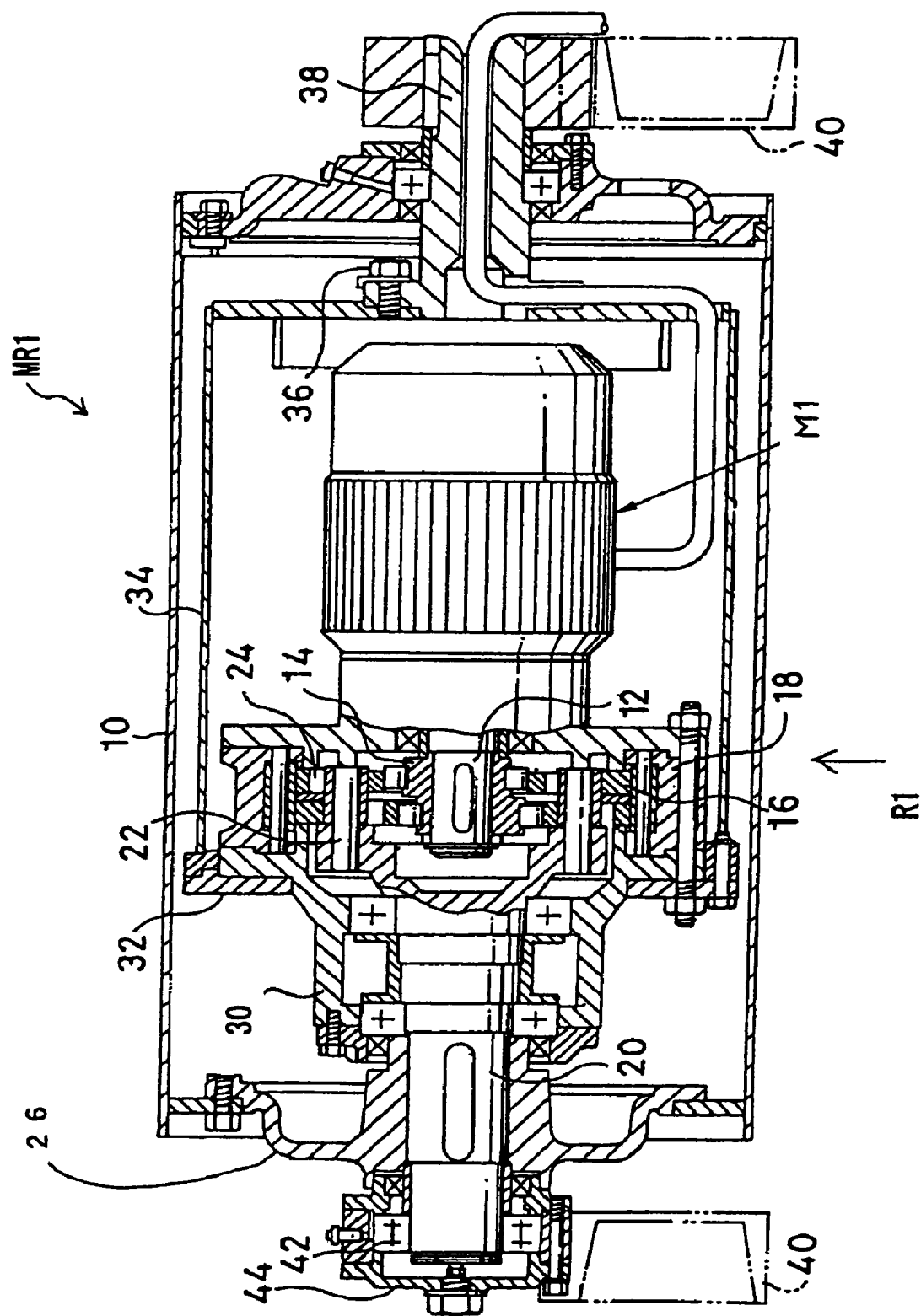
FIG. 6 is a side sectional view showing a conventional motorized roller.

FIG. 3 is a schematic illustration showing the outer peripheral surfaces of the motor casing 133 and the reducer casing 150.

A plurality of air passages 150a (152a, 153a, 154a) for guiding air in the axial direction L2 from one end of the reducer 140 to the other end are formed in the outer peripheral surface of the reducer casing 150 (152, 153, 154). Moreover, a plurality of air passages 133a (134a, 135a, 136a) are formed in the outer peripheral surface of the motor casing 133 (134, 135, 136). The air passages 133a are positioned substantially in-line with the air passages 150a formed in the outer peripheral surface of the reducer casing 150 and guide air in the axial direction L2 from one end of the motor 130 to the other end.

Furthermore, ventilation holes 146a are formed in the base rotor 146 in the axial direction L2.

In addition, air passages (not shown in the drawing) for guiding air in an axial direction L2 from one end of the roller body 112 to the other end are also formed in the inner peripheral surface 112c of the roller body 112 obliquely relative to the axial direction L2.

Next is a description of the actions of the motorized roller 100 according to the embodiment of the present invention described above.

When the motor shaft 132 (which is the input shaft 132a) of the motor 130 undergoes one revolution, the external gear 143 undergoes a single eccentric oscillation about the input shaft 132a via the eccentric body 142. This eccentric oscillation causes a sequential displacement in the (internal contact) engagement position between the internal gear 144 and the external gear 143 so that the engagement position makes a single rotation. Because the number of teeth of the external gear 143 is less than the number of teeth of the internal gear 144 by a value of N (1 in this example), the external gear 143 undergoes a phase displacement relative to the internal gear 144 by an amount equivalent to this difference N in the number of teeth. However in this embodiment, the external gear 143 is connected to the base rotor 146 via the oscillating shaft 145. As a result, the oscillation component of the external gear 143 is absorbed by the oscillating shaft 145, and only the rotation component caused by the above phase difference is transmitted to the base rotor 146 as a speed reduced rotation, and this reduced rotation is then transmitted to the roller body 112.

According to the motorized roller 100 of this embodiment of the present invention, because the air passages 150a (152a, 153a, 154a) for guiding air in the axial direction L2 from one end of the reducer 140 to the other end are formed in the outer peripheral surface of the reducer casing 150, the air in these air passages 150a is prevented from moving in a circumferential direction in conjunction with the rotation of the roller body, so that movement of the air in the axial direction L2 occurs extremely easily. As a result, air inside the roller body 112 that has been heated by the heat generated by the motor 130 and the reducer 140 can be easily guided away from the reducer casing 150 through these air passages 150a. Therefore, stagnation of the air around the vicinity of the reducer 140 can be prevented, which enables a reduction in temperature increases inside the roller body 112. Moreover, this cooling effect can be achieved with a simple construction, which means the design process is simple and development costs can be reduced.

Furthermore, the motor casing 133 and the reducer casing 150 are positioned coaxially, and the air passages 133a (134a, 135a, 136a) formed in the outer peripheral surface of the motor casing 133 are positioned substantially in-line with the air passages 150a formed in the outer peripheral surface of the reducer casing 150, so as to guide air in the axial direction L2 from one end of the motor 130 to the other end. Therefore, hot air inside the roller body 112 can be more effectively guided out without becoming trapped inside the motor casing 133 and the reducer casing 150, enabling a reduction in temperature increases inside the roller body 112.

In addition, because the air passages 112c for guiding air in the axial direction L2 from one end of the roller body 112 to the other end are formed in the inner peripheral surface of the roller body 112, obliquely relative to the axial direction L2, air that flows in a circumferential direction around the roller body 112 due to the rotation of the roller body 112 can be guided efficiently along the axial direction L2, that is, towards the outside of the roller body 112, by the pump action generated by the rotation of the roller body 112, thereby enabling further reductions in internal temperature increases.

Because the base rotor 146 is positioned inside the roller body 112 on the opposite side of the reducer 140 from the motor 130 and is connected to the oscillating shaft (the output rotational shaft) 145 of the reducer 140 so that power can be transmitted, and because the ventilation holes 146a are formed in this base rotor 146 in the axial direction L2, the existence of the base rotor 146 means that air flow inside the roller body 112 is not inhibited, and the rotation of this base rotor 146 enables air inside the roller body 112 to be actively circulated.

In addition, because the substantially circular plate shaped first and second mounting brackets 114 and 116 that are capable of relative rotation with respect to the roller body 112 are provided at both end sections 112a and 112b of the roller body 112, and because the ventilation holes 114e to 114h and 116e to 116h are formed in these mounting brackets 114 and 116 in the axial direction L2, the motorized roller 100 can be made more compact (particularly in the axial direction L2), the mounting strength can be improved, ventilation between the inside of the roller body 112 and the exterior becomes possible through the ventilation holes 114e to 114h and 116e to 116h, and a reduction in potential temperature increases inside the roller body 112 can be achieved.

In the embodiment described above, the air passages formed in the inner peripheral surface 112c of the roller body 112 were obliquely formed relative to the axial direction L2, but the present invention is not restricted to such a configuration.

Furthermore, the ventilation holes 146a in the base rotor 146 were provided in the axial direction L2 of the base rotor 146, but these ventilation holes could also be obliquely formed relative to the axial direction L2, and in such a case, a pumping effect should be realized by the rotation of the base rotor 146, thereby enabling further improvements in the air circulatory effect.

In the embodiment described above, an oscillating inner gearing planetary gear reducer was employed as the reducer 140, but the present invention is not restricted to this configuration.

In addition, the shapes and sizes of the mounting brackets are not restricted in any way by the components shown in the drawings, and any substantially circular shaped member that is capable of relative rotation with respect to the roller body 112 is suitable.

According to the present invention, a cooling structure for a motorized roller that has a simple construction and is capable of effectively reducing temperature increases inside the apparatus can be provided.

The disclosure of Japanese Paten Application No. 2003-87589 filed Mar. 27, 2003 including specification, drawings and claims is incorporated herein by reference in its entirety.

What is claimed is:

1. A cooling mechanism for a motorized roller comprising:
    a roller body of the motorized roller;
    a motor disposed inside the roller body, the motor being housed in a motor casing; and
    a reducer which is disposed inside the roller body and reduces the rotation of the motor to transmit the reduced rotation to the roller body, the reducer being housed in a reducer casing; wherein
    a reaction force to the driving force of the roller body is able to be received, via the motor casing and the reducer casing, by an external member which fixes the motor casing and the reducer casing so that rotations of the casings are prevented, and
    an air passage for guiding air in an axial direction from one end of the reducer to another end is formed in an outer peripheral surface of the reducer casing.

2. The cooling mechanism for a motorized roller according to claim 1, wherein
    the casing for the motor is positioned coaxially with the casing of the reducer, and
    an air passage is formed in an outer peripheral surface of the motor casing so as to position the air passage of the casing of the motor in communication with the air passage formed in the outer peripheral surface of the casing of the reducer and guide air in the axial direction from one end of the motor to the other end.

3. The cooling mechanism for a motorized roller according to claim 2, wherein
    an air passage for guiding air in the axial direction from one end of the roller body to the other end is formed in an inner peripheral surface of the roller body.

4. The cooling mechanism for a motorized roller according to claim 3, wherein
    the air passage formed in the inner peripheral surface of the roller body is obliquely formed relative to the axial direction.

5. The cooling mechanism for a motorized roller according to claim 2, wherein
   mounting flanges that have a substantially circular plate shape and are capable of relative rotation with respect to the roller body are provided at both end sections of the roller body, and
   ventilation holes are formed in the mounting flanges in the axial direction.

6. The cooling mechanism for a motorized roller according to claim 1, wherein
   an air passage for guiding air in the axial direction from one end of the roller body to the other end is formed in an inner peripheral surface of the roller body.

7. The cooling mechanism for a motorized roller according to claim 6, wherein
   the air passage formed in the inner peripheral surface of the roller body is obliquely formed relative to the axial direction.

8. The cooling mechanism for a motorized roller according to claim 1, wherein
   mounting flanges that have a substantially circular plate shape and are capable of relative rotation with respect to the roller body are provided at both end sections of the roller body, and
   ventilation holes are formed in the mounting flanges in the axial direction.

9. The cooling mechanism for a motorized roller according to claim 1, wherein
   mounting flanges that have a substantially circular plate shape and are capable of relative rotation with respect to the roller body are provided at both end sections of the roller body, and
   ventilation holes are formed in the mounting flanges in the axial direction.

10. A cooling mechanism for a motorized roller comprising:
    a roller body of the motorized roller;
    a motor disposed inside the roller body, the motor being housed in a motor casing;
    a reducer which is disposed inside the roller body and reduces the rotation of the motor, the reducer being housed in a reducer casing; and
    a rotor which is disposed inside the roller body, and connected with the reducer and the roller body to transmit power of the reducer to the roller body; wherein
    a reaction force to the driving force of the roller body is able to be received, via the motor casing and the reducer casing, by an external member which fixes the motor casing and the reducer casing so that rotations of the casings are prevented, and
    a ventilation passage is formed in the rotor to guide air in an axial direction wherein
    mounting flanges that have a substantially circular plate shape and are capable of relative rotation with respect to the roller body are provided at both end sections of the roller body, and
    ventilation passages are formed in the mounting flanges in the axial direction.

11. The cooling mechanism for a motorized roller according to claim 10, wherein
    the ventilation passage in the rotor is obliquely formed relative to the axial direction of the rotor.

* * * * *